United States Patent Office 3,614,855
Patented Oct. 26, 1971

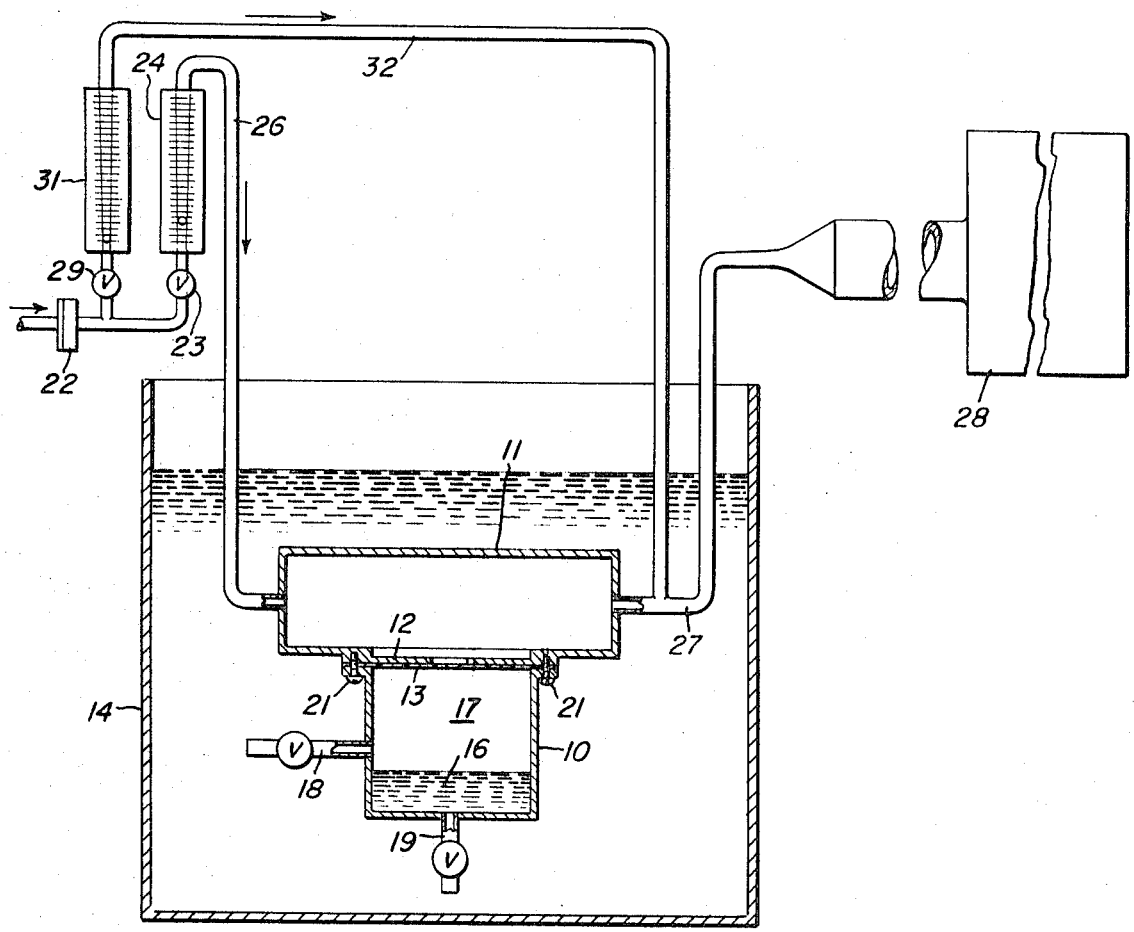

3,614,855
CONTINUOUS PRODUCTION OF CALIBRATION GAS FLOWS
Frank W. Van Luik, Jr., Schenectady, N.Y., assignor to General Electric Company
Filed Dec. 26, 1967, Ser. No. 693,471
Int. Cl. B01d 59/12
U.S. Cl. 55—16                                2 Claims

ABSTRACT OF THE DISCLOSURE

The continuous production of very low predeterminable concentrations of gases in the range from about $10^{-9}$ to $10^{-13}$ gm./cc. is described. The properties of non-porous permeable membranes are employed to controllably provide preselected very low concentrations of some given gas in a chamber having the selectively permeable membrane as at least part of the wall area thereof. In essence the membrane is employed as a flow control valve for the molecular specie of interest. A measured flow of dilution gas is mixed with the predetermined amount of the given gas, which has passed through the membrane wall area creating a mixed flow having a still lower concentration in the given gas. This flow, which is relatively large, is conducted to trace gas measuring equipment for the calibration thereof with respect to detection of the given gas.

---

The invention described herein was made in the course of or under a contract with the Department of the Army.

BACKGROUND OF THE INVENTION

Multi-dilution, a well-known technique having many variations, is the method conventionally employed for preparing very low known concentrations of specific gases. In essence the multi-dilution method consists of establishing an atmosphere of known partial pressure of the gas of interest, constantly passing into and through this atmosphere a dilution gas at a large flow rate to produce an exhaust flow of considerably reduced concentration in the gas of interest. However, the flow volumes that can be practically handled in such a system in relation to the initial concentration of the gas of interest requires that the dilution step be repeated, sometimes as many as 5–6 times before an ultimate concentration having the value of as little as from $10^{-9}$ to $10^{-10}$ gms./cc. can be obtained.

This sequence of dilutions of necessity considerably increases the transit length, which must be negotiated by diluted flow and, thereby, exposes the diluted flow to a large surface area, which must be brought into equilibrium with respect to the gas of interest, before the accuracy of the ultimate concentrations can be relied upon. This period for reaching equilibrium typically requires in excess of three days. In case the equipment should have to be shut down for any emergency or to change the concentration, this same "break-in" equilibrium period has to be repeated on start-up. In addition, at each dilution point the opportunity exists for introducing error in the amount of dilution flow and such errors are cumulative.

In contrast to the above-described method conventionally employed in preparing very low concentrations of gases the instant invention minimizes flow measuring errors and reaches predetermined equilibrated concentrations previously unattainable in practical time periods with a single or, at most, two dilutions. Also, a considerably smaller amount of flow tubing is required and as a result the response time for stabilization, as for example, to a change in calibration gas concentration is drastically reduced. Desired variations in the calibration gas concentration may be made by very simple adjustment or replacement. There is no need for orifices or small tubes and, therefore, problems attendant clogging of such apparatus with dirt have been obviated. Wide variations from a very small to a very large total calibration gas flow may be provided with ease and the overall accuracy of concentration determination is of an order unattainable with multi-dilution techniques.

Although the concept of employing a selectively permeable membrane as a valving or metering mechanism utilized in the instant invention is believed to be unique, the broad concept of using permeable membranes for the separation of gases and vapors dates back to the 19th century. The term "selective permeability" means that under a difference in partial pressure a specific gas will permeate a specific non-porous membrane at a rate specific to that given gas and membrane combination. Thus, given a mixture of gases having different permeation rates, passage of these gases at their respective rates through a given non-porous membrane means that more of the gases having high permeation rates will pass through in any given period of time. Another term, which will be used herein, is the term "permselective membranes" to differentiate these materials from porous materials such as paper which will pass gases, but in a non-selective manner.

The above discussion does not imply the passage of one gas to the complete exclusion of others, but merely indicates that a difference exists between the flow rate of two molecular species through a particular permeable membrane. The net result in the separation of gas mixtures is always that the gas mixture on the high (partial) pressure side of the membrane is depleted in the concentration of the more permeable component and the gas mixture on the low pressure side of the membrane is enriched in the more permeable component.

The mechanism by which gas or vapor permeates the membrane is not a simple diffusion process as occurs in the passage of gases through porous materials. Instead, the gas dissolves in the membrane on the side having a high partial pressure, diffuses through the membrane and then comes out of solution on the side having the low partial pressure of that specific gas. Because of this dual transfer mechanism of solution and diffusion, the conductance or permeability of a given gas is a product of both the diffusion coefficient of the gas in the specific membrane and the solubility of the gas in the specific membrane. As a result, it is found that the phenomenon of permeability is not a direct function of molecular size. Thus, for each given gas in relation to each given membrane material a constant to express the permeability of that gas through the particular membrane material may be determined. This constant, $Pr$ is expressed as $$Pr = \frac{\text{cc. (NTP)} - \text{cm.}}{\text{sec} - \text{cm.}^2 - \text{cm. Hg } \Delta P}$$

NTP=Normal temperature and pressure (25° C. 760 mm. Hg)
cm.=thickness of membrane
cm.²=area of membrane
cm. Hg $\Delta P$=difference in partial pressure Many such constants have been determined and reported by workers in the field of gas separation by this mechanism.

SUMMARY OF THE INVENTION

In accordance with the instant invention the permeability constant of some specific gas is relied upon in order to provide a continuous flow of small predetermined concentration of this gas through a permselective membrane to enable controlled dilution thereof and then transport of the diluted flow to trace gas measuring equipment for detecting concentrations of the specific gas in order to calibrate such equipment.

BRIEF DESCRIPTION OF THE DRAWING

Other objects, features and advantages of the invention will appear more clearly from the following detailed description of the preferred embodiment thereof made with reference to the drawing, which schematically represents the components of a preferred embodiment of the microconcentration gas generator of this invention.

DESCRIPTION OF THE PREFERRED EMBODIMENT

Referring now to the drawing, the apparatus shown partially in cross-section comprises a pair of adjoining chambers 10 and 11 having common wall area 12. At least part of the common wall area 12 consists of permselective membrane 13. The remainder of the wall area of both chambers 10 and 11 is impermeable. Chambers 10 and 11 are kept at a constant temperature either in the constant temperature bath 14, as shown, or in some other apparatus capable of supplying a controlled constant ambient temperature, as for example, an oven.

Chamber 10 contains a liquid 16, which is a solution having a known concentration in the specific gas to be measured. This solution is the source for providing a predetermined partial pressure in this specific gas in the volume 17 above liquid 16. Since the total number of molecules of the specific gas leaving chamber 10 through membrane 13 is quite small over an extended period, replenishment or replacement of liquid 16 is infrequent, but may be effected by disassembly or by the use of the inlet and drain means shown (represented by numerals 18, 19, respectively) after removal of the apparatus from bath 14. By removing fastenings 21 chamber 10 (including membrane 13) may be easily removed and replaced with a different chamber 10 containing a fresh or different solution, or simply the desired gas, and a different membrane 13 or a membrane of a different thickness.

By establishing a known partial pressure in volume 17 in chamber 10 and at the same time insuring a very low partial pressure (substantially zero) in chamber 11 for this same gas a known, or calculable, driving force exists to urge the passage of molecules of the specific gas of interest from space 17 through the membrane 13 and into chamber 11. The rate of flow of this gas through membrane 14 is expressed by the relationship:

$$\text{Flow rate} = \frac{Pr \times \Delta P \times A}{T}$$

where $Pr$ is the permeability constant for the specific gas-membrane material combination; $A$ is the membrane area (expressed in cm.) exposed; $T$ is the membrane thickness (expressed in cm.), and $\Delta P$ is the difference in partial pressure (expressed in cm. of Hg) of the gas across the membrane.

The prime function of the membrane 13 is to perform as a metering valve whereby a very small, but predetermined, density of the specific gas can be supplied at the downstream face of membrane 13 (that is, in chamber 11) in a thoroughly reliable fashion. By providing this capability this invention makes possible the preparation of known concentrations as low as $10^{-12}$ to $10^{-13}$ gm./cc. with one or, at the most, two dilutions. The surface area to which these metered gas molecules are exposed downstream of membrane 13 is comparatively very small resulting in the achievement of equilibrium conditions in a matter of from less than one to several hours.

This metering valve usage of permselective membrane materials is the antithesis of the well-known usage of such membrane materials for gas separation. In gas separation the emphasis is on securing the maximum gas molecule throughput of the specie sought, while in the instant invention a throttling-metering action is actually desired. Usually, this difference is manifest in the thickness of the membrane, the membranes of the instant invention generally being much thicker. Although the membrane thickness is not critical, in gas separation the nonporous permselective membrane ranges from sub-mil thickness to about 2 mils. In the case of the instant invention (depending on the downstream predetermined gas concentration desired) the membrane thickness will range from about 2 mils to about 175 mils.

By this mechanism the partial pressure in the given specie at the downstream face of membrane 13 will typically have a known magnitude about $1 \times 10^{-6}$ to $1 \times 10^{-8}$ of the partial pressure available in the multi-dilution method immediately prior to the first dilution. This provision considerably simplifies the entire process and insures the production of workable flows without the need to reduce the flow by removing partially diluted gas from the system.

To illustrate the throttling-metering capabilities of a silicone rubber membrane 80 mils thick, with a concentration of 125 gms./1000 cc. of $NH_3$ in water at 24° C. the vapor pressure of $NH_3$ in volume 17 would be 100 mm. of mercury. At the downstream face of membrane 13 the partial pressure of $NH_3$ would be $3 \times 10^{-5}$ mm. of mercury. This latter value is considerably less than the 11.4 mm. partial pressure of $NH_3$, which would be available without the membrane even at 0° C. with a 4.72% $NH_3$ solution.

Similarly, using a mixture of 200 cc. $SO_2$ gas in 2000 cc. of air at 24° C. in chamber 10 in place of a liquid solution the partial pressure of $SO_2$ in space 17 would be 76 mm. Hg as compared to $1.5 \times 10^{-6}$ mm. Hg of $SO_2$ at the downstream face of membrane 13.

In a practical system the value of the partial pressure of the gas of interest in the flow zone in contact with the downstream face of membrane 13 should be at least as low as $10^{-3}$ mm. of Hg at 24° C.

Dilution gas is supplied under pressure from a source (not shown) via filter 22, valve 23, flow meter 24 and conduit 26 at a predetermined flow rate determied by flow meter 24 to chamber 11 where it mixes with the very small, but known, amount of the specific gas leaving the membrane 13. The dilution gas shall have been scrubbed clean of any traces of the gas of interest prior to admission to the system. The relatively large mixed flow of very low (about $10^{-9}$ to $10^{-13}$ gm./cc.) specific gas concentration is conducted out of chamber 11 via the conduit 27 to trace gas measuring equipment 28. Various dilution gases, as for example, air, nitrogen, oxygen and any of the inert gases may be employed. Also, if desired, baffles or other mix-inducing means (not shown) may be included in chamber 11. If desired, a second dilution may be effected further downstream, as, for example, via valve 29, flow meter 31 and conduit 32 rather than to design chamber 11 to accommodate inordinately large volumes of gas flow.

The flow meters 24, 31 are advantageously of the variable area type often referred to as a "Rotameter." A number of designs are commercially available, one manufacturer being Brooks Instrument Co., Inc., Hatfield, Pa.

The source of the gas of interest for metering through membrane 13 need not be obtained from a liquid solution, it may, for example, be supplied to chamber 10 as a gas. Preferably a small gas cylinder containing the gas of interest or a mixture thereof would be permanently connected to inlet 18 and immersed in the constant temperature ambient with chambers 10 and 11.

In one application of the instant invention liquid 16 was a solution of ammonia in water (125 gms. $NH_3/1000$ cc. $H_2O$ at 24° C.). The membrane was non-porous silicone 80 mils thick, the opening into chamber 11 was 0.25" in diameter providing an area of 0.317 cm.$^2$. Filtered air was used as the dilution gas and was admitted to chamber 11 at a flow rate of 250 cc./sec. This single dilution resulted in a concentration of $3 \times 10^{-11}$ gms. of $NH_3$/cc. of gas flow. Recharging would be required once in 80 years.

In a second application of the instant invention 200 cc. of $SO_2$ gas were injected by syringe directly into 2000 cc. of air at 24° C. in chamber 10 providing a known partial pressure. Recharging would be required about once per month. The same membrane material and communicating area as above were employed. Once again filtered air was employed as the dilution gas and the flow rate was 300 cc./sec. The resulting mixture had a concentration of $3 \times 10^{-12}$ gm. of $SO_2$/cc. with a single dilution.

Operation of the micro-concentration gas generator over periods of several weeks has shown no significant variation in the concentration and response times ranging from 5 to 30 minutes at concentration levels of $10^{-12}$ gm./cc. have been observed.

There is no limitation to specific gases. Any gas should be amendable to the preparation of very low predeterminable concentrations so long as compatible membrane and confining materials are employed.

The temperature of the bath 14, the concentration of gas in liquid 16 (the partial pressure of the gas of interest in volume 17), the specific membrane material and the thickness thereof are all variables that may be selected to pre-determine the rate of passage of specific gas molecules through membrane 13.

In the application specifically described herein (calibration of trace gas measuring equipment) fairly large volumes of calibrating gas are required and calibrating flows at rates ranging from 50 to over 300 cc./sec. having concentrations ranging from $10^{-9}$ to $10^{-13}$ gm./cc. of the gas of interest are readily available with the instant invention.

Data on the permselective properties of many solid plastic membranes and methods for preparation thereof have been disclosed in numerous patents and articles in the literature (for example, "Gas Permeability of Plastics" by Major et al., Modern Plastics, page 135 et seq., July, 1962; U.S. 3,256,675, Robb; U.S. 3,274,750; Robb; U.S. 3,325,330, Robb and U.S. 3,350,844, Robb) and it, therefore, should be an obvious extension of the teachings set forth herein to select from the many possible gas-membrane combinations available and construct variations of the micro-concentration gas generator construction as defined in the appended claims.

What I claim as new and desire to secure by Letters Patent of the United States is:

1. In a method for the continuous production of a predetermined concentration of a specific gas wherein a concentration of specific gas molecules is provided and a dilution gas is mixed therewith at a known flow rate to produce a mixture having a concentration of the specific gas of less than about $10^{-9}$ gm./cc., the improvement comprising the steps of:
    (a) providing a given partial pressure of a specific gas of interest in a closed volume at a substantially constant temperature,
    (b) permitting a constant metered flow of the molecules of said specific gas from said closed volume through a non-porous permselective membrane into a flow zone at a rate to produce in said flow zone a partial pressure of said specific gas equivalent to a value of partial pressure at 24° C. of less than about $10^{-3}$ millimeters of mercury,
    (c) maintaining said flow zone at substantially constant temperature, and
    (d) diluting said specific gas flow in said flow zone with a second gas flow at a known flow rate to produce a mixed gas flow having a calculable concentration of less than $10^{-9}$ gm./cc. in said specific gas.

2. The improvement as recited in claim 1 wherein the metering is accomplished through a non-porous polymer having a thickness of at least about 80 mils.

References Cited
UNITED STATES PATENTS

| | | | |
|---|---|---|---|
| 3,241,293 | 3/1966 | Pfefferle | 55—16 |
| 3,245,206 | 4/1966 | Bonnet | 55—158 |
| 3,303,105 | 2/1967 | Konikoff et al. | 55—16 |
| 3,398,505 | 8/1968 | Llewellyn | 55—16 |
| 3,398,507 | 8/1968 | Balough et al. | 55—55 |

REUBEN FRIEDMAN, Primary Examiner

CHARLES N. HART, Assistant Examiner